US010657638B2

(12) United States Patent
Milligan (10) Patent No.: US 10,657,638 B2
(45) Date of Patent: May 19, 2020

(54) WAFER MAP PATTERN DETECTION BASED ON SUPERVISED MACHINE LEARNING (71) Applicant: Mentor Graphics Corporation, Wilsonville, OR (US)

(72) Inventor: Patrick Jon Milligan, Chandler, AZ (US)

(73) Assignee: Mentor Graphics Corporation, Wilsonville, OR (US)

( * ) Notice: Subject to any disclaimer, the term of this patent is extended or adjusted under 35 U.S.C. 154(b) by 276 days.

(21) Appl. No.: 15/966,375

(22) Filed: Apr. 30, 2018

(65) Prior Publication Data

US 2018/0330493 A1 Nov. 15, 2018

Related U.S. Application Data

(60) Provisional application No. 62/491,444, filed on Apr. 28, 2017.

(51) Int. Cl.
*G06K 9/62* (2006.01)
*G06T 7/00* (2017.01)
(Continued)

(52) U.S. Cl.
CPC .......... *G06T 7/0006* (2013.01); *G06K 9/6256* (2013.01); *G06K 9/66* (2013.01);
(Continued)

(58) Field of Classification Search
CPC ..... G06T 7/0006; G06T 7/0004; G06T 7/001; G06T 2207/20081; G06T 2207/20084; G06T 2207/30148; G06N 3/088; G06N 3/0409; G06N 3/08; G06N 3/126; G06N 20/00; G06N 20/10; G06K 9/66; G06K 9/6256
See application file for complete search history.

(56) References Cited

U.S. PATENT DOCUMENTS 7,229,845 B1 * 6/2007 Luu .................. G06Q 50/04
257/E21.525
2007/0156379 A1 * 7/2007 Kulkarni ............ G06F 30/30
703/14

(Continued)

OTHER PUBLICATIONS

Andy Wee et al., "Wafer Map Failure Pattern Recognition Using Artificial Intelligence", IEEE SW Test Workshop, Semiconductor Wafer Test Workshop, Jun. 10-13, 2012, San Diego, CA.

(Continued)

*Primary Examiner* — Carol Wang (57) ABSTRACT

Various aspects of the disclosed technology relate to training and applying a machine learning model for defect pattern detection. Defect pattern variants of one or more defect patterns are generated. The one or more defect patterns are extracted from wafer maps of wafers having at least systematic defects. Each of the generated defect pattern variants is superimposed on wafer maps of wafers having no systematic defects to generate positive training data of wafer maps, which are included in a training dataset. Based on the training dataset, a trained machine-learning model for recognizing known defect patterns on wafer maps is derived.

24 Claims, 10 Drawing Sheets

Flow chart 300

(51) Int. Cl.
*G06N 3/04* (2006.01)
*G06K 9/66* (2006.01)
*G06N 20/00* (2019.01)
*G06N 3/08* (2006.01)
G06N 3/12 (2006.01)
G06N 20/10 (2019.01)

(52) U.S. Cl.
CPC ........... *G06N 3/0409* (2013.01); *G06N 3/088* (2013.01); *G06N 20/00* (2019.01); *G06T 7/001* (2013.01); *G06T 7/0004* (2013.01); G06N 3/08 (2013.01); G06N 3/126 (2013.01); G06N 20/10 (2019.01); G06T 2207/20081 (2013.01); G06T 2207/20084 (2013.01); G06T 2207/30148 (2013.01)

(56) References Cited

U.S. PATENT DOCUMENTS

| | | | | |
|---|---|---|---|---|
| 2017/0047195 | A1* | 2/2017 | Lee | H01J 37/222 |
| 2017/0177997 | A1* | 6/2017 | Karlinsky | G06N 3/08 |
| 2017/0193400 | A1* | 7/2017 | Bhaskar | G06N 3/0454 |
| 2017/0194126 | A1* | 7/2017 | Bhaskar | G01N 23/2251 |

OTHER PUBLICATIONS

Chung-Shou Liao et al., "Similarity Searching for Defective Wafer Bin Maps in Semiconductor Manufacturing," IEEE Transactions on Automation Science and Engineering, vol. 11, No. 3, Jul. 2014.

\* cited by examiner

Random defect pattern

+

Systematic defect pattern

WAFER MAP PATTERN DETECTION BASED ON SUPERVISED MACHINE LEARNING

RELATED APPLICATIONS

This application claims the benefit of U.S. Provisional Patent Application No. 62/491,444, filed on Apr. 28, 2017, and naming Patrick Jon Milligan as inventor, which application is incorporated entirely herein by reference.

FIELD OF THE DISCLOSED TECHNOLOGY

The presently disclosed technology relates to the field of semiconductor manufacturing and testing. Various implementations of the disclosed technology may be particularly useful for test data analysis, yield ramp-up, and outlier removal.

BACKGROUND OF THE DISCLOSED TECHNOLOGY

The semiconductor manufacturing processes are lengthy and complex, typically including 100-200 process steps. In a fabrication facility (fab), wafers move from step to step in groups of identical wafers. Integrated circuits are eventually fabricated on small areas of wafers (dies). Depending on the sizes of dies and wafers, each wafer may contain several hundred to several thousand dies. Large wafer fabrication facilities can produce thousands of wafers per week. After wafer fabrication, circuit probe testing is performed on each die on the wafer, wafers are then diced, and good dies are packaged into chips and shipped to the customer.

To maintain competitive advantage, a fabrication facility continuously employs new technologies, increases yield, and reduces costs. As semiconductor manufacturing moves down to smaller technology nodes, more steps and greater complexity are introduced into manufacturing processes. This makes yield ramp-up increasingly difficult. A delay in yield ramp-up can cost millions or even billions of dollars. After the initial yield ramp-up stage, quick responses to yield excursions and further increases of yields are also important to reduce costs of scraped wafers and dies.

Enhancing/maintaining yields requires root causes of defective wafers be diagnosed and identified. One of the effective techniques for determining the root causes is analyzing defect patterns on wafers. A wide range of measurements are performed on each wafer, including particle data, in-line electrical measurements, and circuit probe testing which is noted previously. Results of one or more of these measurements may be used to construct wafer maps. One of the common types of wafer maps is sometimes referred to as wafer bin maps. Wafer bin maps are generated based on results of circuit probe testing. Circuit probe testing, typically conducted using Automatic Test Equipment (ATE), can generate a vector of 15~20 dimensional measurement for each die. The wafer map can be binary or non-binary. A binary wafer map simply shows pass/fail results of dies while a non-binary map can be used to show binning results. A binning method places dies into different categories or "bins" according to the measured parameters. Each bin may be assigned with a code. A good die can pass the tests thoroughly and be assigned with the best grade. Other bin code assignments usually indicate different degrees of quality inferiority.

Defective dies on a wafer can occur at random, as clustered, or both. These defective patterns are usually associated with specific manufacturing problems. Random failure patterns are typically caused by random particles or noises in the manufacturing environment. In practice, completely eliminating these random defects is difficult. Spatial-correlated patterns reflect systematic defects and provide a clue that equipment malfunctions or process variations have occurred. Identifying and analyzing these non-random (characteristic or systematic) defect patterns can help to discover the root causes and their solutions for yield improvement.

Traditionally, experienced engineers perform visual identification and analysis of defect patterns on wafer maps. Human factors such as experience, domain knowledge and fatigue due to a large volume of data can lead to inaccurate and inconsistent judgments. Statistic and machine learning techniques have been developed to overcome the human-related limitations. The machine learning techniques can be supervised or unsupervised. An unsupervised machine learning technique can group similar defect patterns together and thus can identify new types of characteristic patterns. A supervised machine learning technique, on the other hand, first trains a machine learning model using a set of training samples having either no systematic defect patterns or having known systematic defect patterns. The trained machine learning model is then applied to wafer maps of newly fabricated wafers to search for the known systematic defect patterns.

A major challenge for applying a supervised machine learning technique is the lack of sufficient high-quality training samples. The wafer samples are often limited and may not cover various hybrid patterns (systematic+random) or similar defect patterns with potential small changes. The problem of training samples can severely reduce the effectiveness of the supervised machine learning technique.

BRIEF SUMMARY OF THE DISCLOSED TECHNOLOGY

Various aspects of the disclosed technology relate to training and applying a machine learning model for defect pattern detection. In one aspect, there is a method, comprising: generating defect pattern variants of one or more defect patterns, the one or more defect patterns being extracted from wafer maps of wafers having at least systematic defects, a wafer map of a wafer being a map generated based on results of one or more measurements performed on the wafer; superimposing each of the defect pattern variants on wafer maps of wafers having no systematic defects to generate positive training data of wafer maps to be included in a training dataset; and deriving a trained machine-learning model for recognizing known defect patterns on wafer maps based on the training dataset, the known defect patterns comprising the one or more defect patterns.

The method may further comprise: analyzing wafer maps for newly-fabricated wafers based on the trained machine-learning model. The method may still further comprise: adjusting manufacturing processes, manufacturing equipment or both based on root causes identified from the analyzing. Alternatively or additionally, the method may still further comprise: identifying dies that pass measurements but are at higher risk of field failure based on failure patterns identified from the analyzing, the measurements comprising the one or more measurements.

The machine learning model may be constructed based on an artificial neural network. The one or more defect patterns may be extracted using an unsupervised machine learning model or a statistical technique. The defect pattern variants may comprise rotational variants, location variants, size variant, or any combination thereof. The one or more measurements may comprise circuit probe testing.

In another aspect, there are one or more non-transitory computer-readable media storing computer-executable instructions, the computer-executable instructions, when executed, causing one or more processors to perform the above method.

In still another aspect, there is a system comprising one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclose technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Various aspects of the disclosed technology relate to training and applying a machine learning model for defect pattern detection. Numerous details are set forth for the purpose of explanation. However, one of ordinary skill in the art will realize that the disclosed technology may be practiced without the use of these specific details. In other instances, well-known features have not been described in detail to avoid obscuring the presently disclosed technology.

The detailed description of a method or a device sometimes uses terms like "generate," "superimpose," and "derive" to describe the disclosed method or the device function/structure. Such terms are high-level descriptions. The actual operations or functions/structures that correspond to these terms will vary depending on the particular implementation and are readily discernible by one of ordinary skill in the art.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

Illustrative Operating Environment

Figure 1:
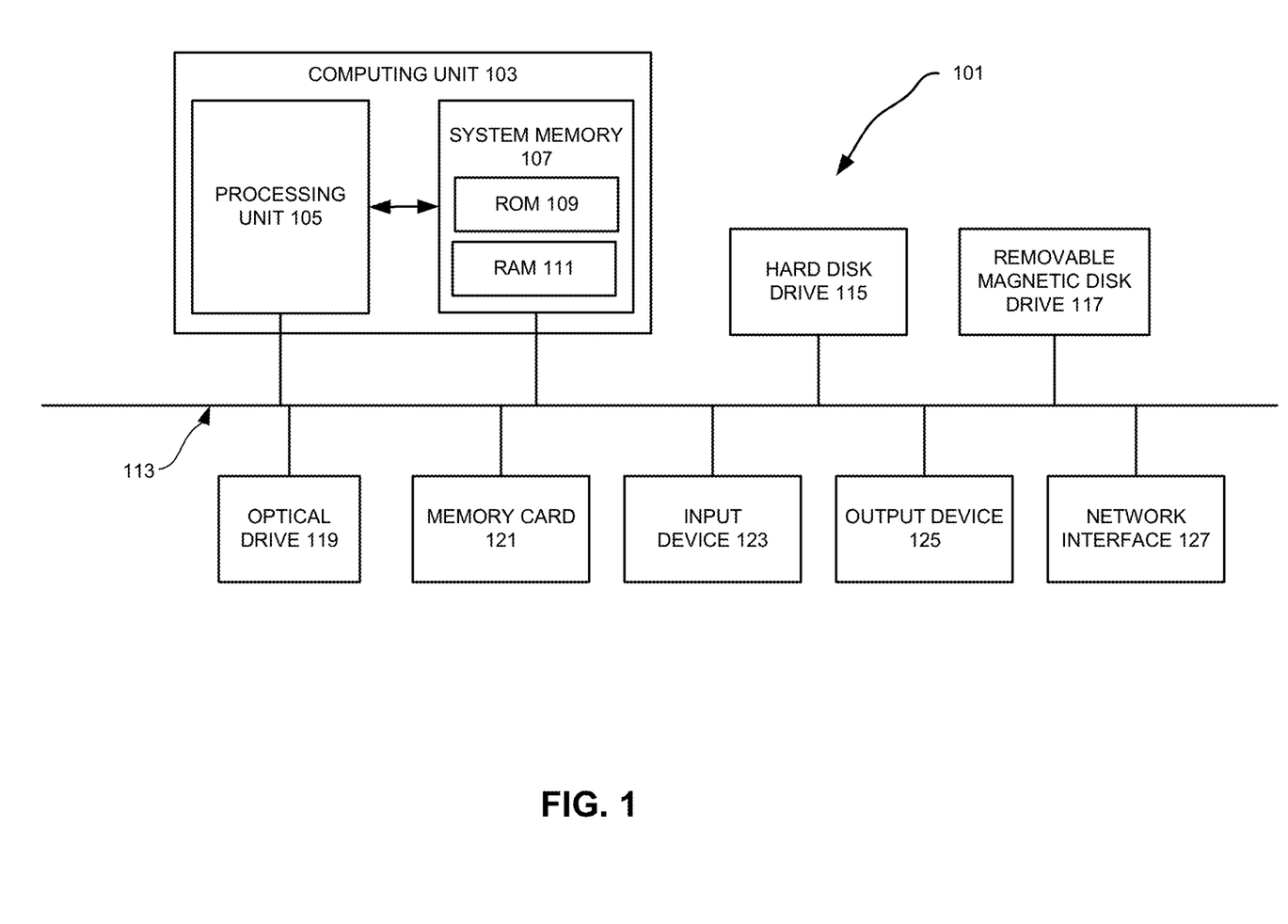
FIG. 1 illustrates a programmable computer system with which various embodiments of the disclosed technology may be employed.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it is not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multi-processor computer, a plurality of single and/or multiprocessor computers arranged into a network, or some combination of both.

Machine Learning Based Pattern Detection Tool

Figure 2:
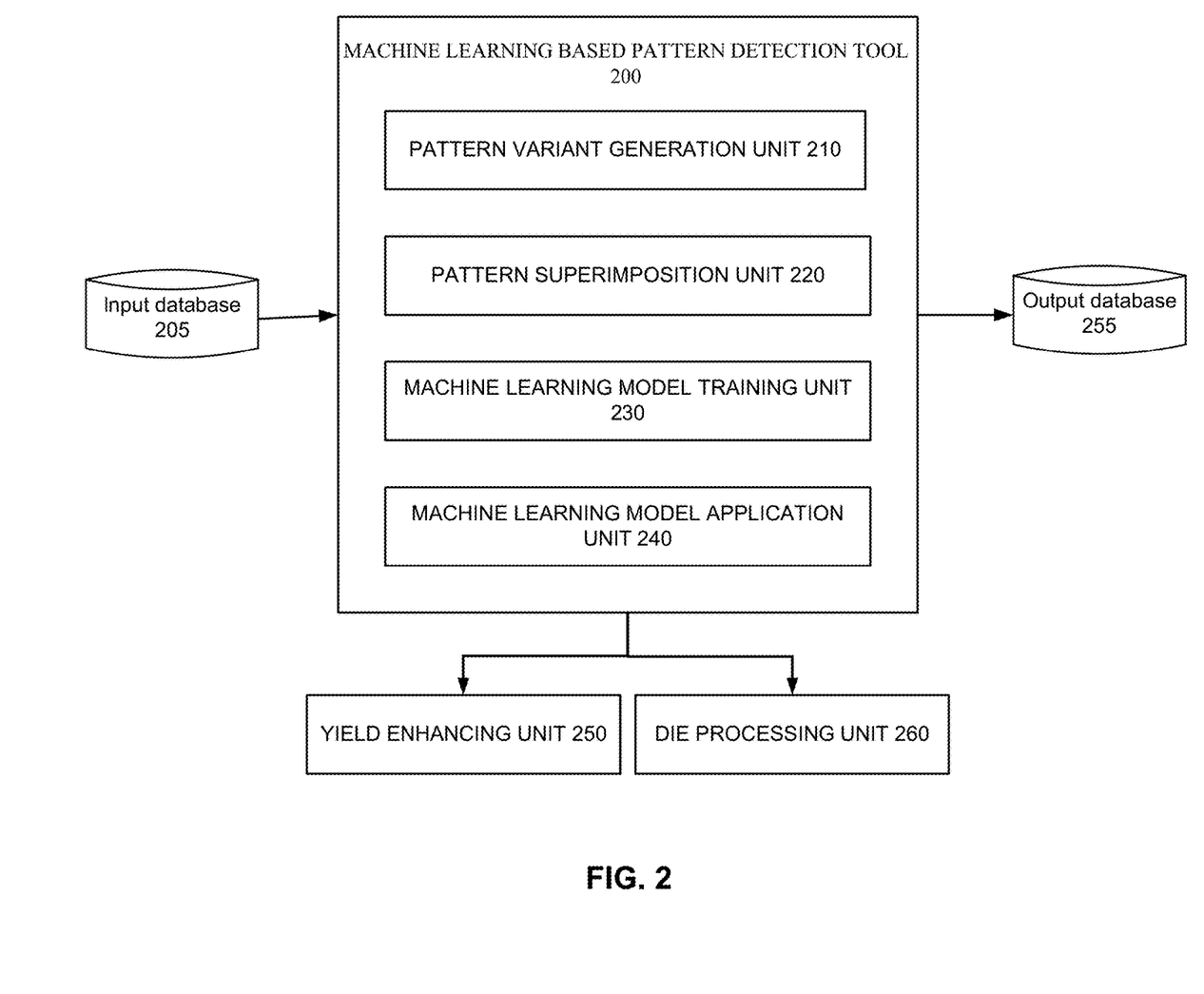
FIG. 2 illustrates an example of a machine learning based pattern detection tool 200 that may be implemented according to various embodiments of the disclosed technology.

FIG. 2 illustrates an example of a machine learning based pattern detection tool 200 that may be implemented according to various embodiments of the disclosed technology. As seen in this figure, the machine learning based pattern detection tool 200 includes a pattern variant generation unit 210, a pattern superimposition unit 220, a machine learning model training unit 230 and a machine learning model application unit 240. Some implementations of the machine learning based pattern detection tool 200 may cooperate with (or incorporate) one or more of a yield enhancing unit 250, a die processing unit 260, an input database 205 and an output database 255.

As will be discussed in more detail below, the machine learning based pattern detection tool 200 receives one or more defect patterns and wafer maps of wafers having no systematic defects. The one or more defect patterns are extracted from wafer maps of wafers having at least systematic defects. The pattern variant generation unit 210 generates defect pattern variants of the one or more defect patterns. The pattern superimposition unit 220 superimposes each of the defect pattern variants on the wafer maps of wafers having no systematic defects to generate positive training data of wafer maps for a training dataset. Based on the training dataset, the machine learning model training unit 230 derives a trained machine-learning model for recognizing known defect patterns on wafer maps. The known defect patterns comprise the one or more defect patterns. The machine learning model application unit 240 uses the trained machine learning model to analyze wafer maps for newly-fabricated wafers. The yield enhancing unit 250 may adjust manufacturing processes, manufacturing equipment, or both based on root causes identified from the analysis if systematic defects are detected. Additionally or alternatively, the die processing unit 260 may identify dies that are not defective based on measurements comprising the one or more measurements but are at higher risk of field failure based on failure patterns identified from the analysis. The machine learning based pattern detection tool 200 may store final and/or intermediate results in the output database 255.

As previously noted, various examples of the disclosed technology may be implemented with one or more computing systems, such as the computing system illustrated in FIG. 1. Accordingly, one or more of the pattern variant generation unit 210, the pattern superimposition unit 220, the machine learning model training unit 230, the machine learning model application unit 240, the yield enhancing unit 250, and the die processing unit 260 may be implemented by executing programming instructions on one or more processors in one or more computing systems, such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the pattern variant generation unit 210, the pattern superimposition unit 220, the machine learning model training unit 230, the machine learning model application unit 240, the yield enhancing unit 250, and the die processing unit 260. As used herein, the term "non-transitory computer-readable medium" refers to computer-readable medium that are capable of storing data for future retrieval and not propagating electro-magnetic waves. The non-transitory computer-readable medium may be, for example, a magnetic storage device, an optical storage device, or a solid state storage device.

It also should be appreciated that, while the pattern variant generation unit 210, the pattern superimposition unit 220, the machine learning model training unit 230, the machine learning model application unit 240, the yield enhancing unit 250, and the die processing unit 260 are shown as separate units in FIG. 2, a single computer (or a single processor within a master computer) or a single computer system may be used to implement all or some of these units at different times, or components of these units at different times.

With various examples of the disclosed technology, the input database 205 and the output database 255 may be implemented using any suitable computer readable storage device. That is, either of the input database 205 and the output database 255 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 205 and the output database 255 are shown as separate units in FIG. 2, a single data storage medium may be used to implement some or all of these databases.

Training And Applying Machine Learning Model For Defect Pattern Detection

Figure 3:
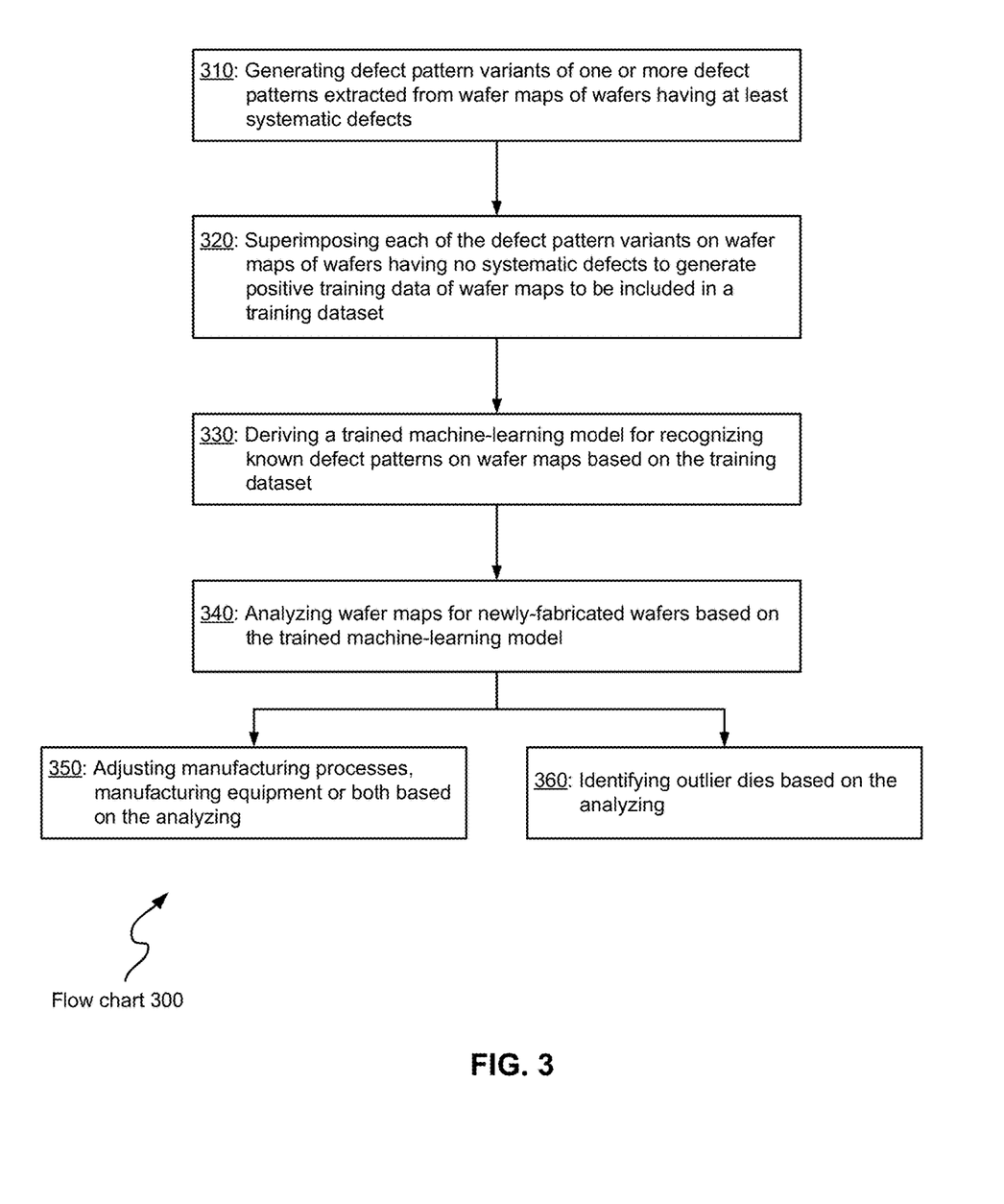
FIG. 3 illustrates a flowchart 300 showing a process for training and applying a machine learning model for defect pattern detection that may be implemented according to various examples of the disclosed technology.

FIG. 3 illustrates a flowchart 300 showing a process for training and applying a machine learning model for defect pattern detection that may be implemented according to various examples of the disclosed technology. For ease of understanding, methods for training and applying a machine learning model for defect pattern detection that may be employed according to various embodiments of the disclosed technology will be described with reference to the machine learning based pattern detection tool 200 illustrated in FIG. 2 and the flow chart 300 in FIG. 3. It should be appreciated, however, that alternate implementations of a machine learning based pattern detection tool may be used to perform the method for training and applying a machine learning model for defect pattern detection illustrated by the flow chart 300 according to various embodiments of the disclosed technology. In addition, it should be appreciated that implementations of the machine learning based pattern detection tool 200 may be employed to implement methods for training and applying a machine learning model for defect pattern detection other than the one illustrated by the flow chart 300 in FIG. 3 according to different embodiments of the disclosed technology.

In operation 310, the pattern variant generation unit 210 generates defect pattern variants of one or more defect patterns. The one or more defect patterns are extracted from wafer maps of wafers having at least systematic defects. A wafer map is a map generated based on results of one or more measurements performed on the wafer. As noted previously, a wide range of measurements or tests are performed on wafers while the wafers are being manufactured and after the wafers have been manufactured. These measurements can be used for process control monitoring, wafer level reliability testing or both. Process control monitoring helps to maintain or improve yields while wafer level reliability testing can help to identify process anomalies that could degrade device parameters over the long term.

Circuit probe testing, a type of wafer measurements, is performed during the final phase of wafer fabrication and before wafers are scribed and cut into dies (chips). Circuit probe testing can include parametric testing, functional testing and scan testing. Parametric testing measures electrical properties of pin electronics such as delay, voltages, and currents. Iddq testing, for example, measures the supply current (Idd) in the quiescent state (i.e., the circuit is not switching and inputs are held at static values). The current consumed in this state is commonly called Iddq for Idd (quiescent). Many common semiconductor manufacturing defects can cause the current to increase by orders of magnitude, which can be easily detected. Both functional testing and scan testing apply a set of test stimuli (test patterns) to the circuit on a die and then analyzing responses generated by the circuit. Functional testing attempts to validate that the circuit-under-test operates according to its functional specification while scan testing tries to ascertain that the circuit-under-test has been assembled correctly from some low-level building blocks as specified in a structural netlist and that these low-level building blocks and their wiring connections have been manufactured without defect.

Measurement results can be simply pass/fail or be assigned to a grade. Each grade can be presented using a unique bin code. A good die can pass the tests thoroughly and be assigned to the best grade and other bin code assignments indicate different degrees of quality inferiority. The number of bin codes can be less than ten or up to a few dozen. The spatial distribution of pass/fail or quality grades across a wafer can be represented by a wafer map. Wafer maps can contain characteristic patterns or signatures, which provide insight into the fitness of the manufacturing processes. This is because defect patterns are usually associated with specific manufacturing problems. A line formed by defective dies may be caused by a mechanical problem—a scratch or crack—in the surface of the wafer. Mask misalignment in the lithographic process can generate a checkerboard defect pattern on the wafer. The abnormal temperature control in the rapid thermal annealing process (RTP) can generate a ring of failing chips around the edge of the wafer. If the defects concentrate in the center of the wafer, there is likely a problem controlling the thickness of a chemical resist deposited on the surface of the wafer prior to lithography. These are just examples of systematic defect patterns. Systematic defect patterns may include other shapes such as arc and crescent moon patterns. The association between the patterns and the equipment/process problems may be different between different manufacturers or different manufacturing processes.

Figure 4:
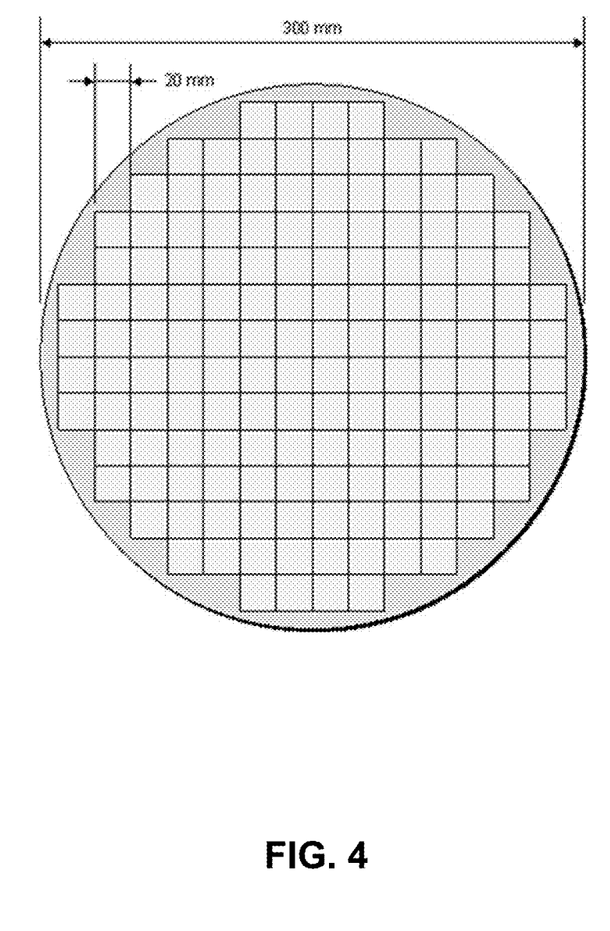
FIG. 4 illustrates an example of 20 mm×20 mm dies on a 300 mm wafer.
Figure 5:
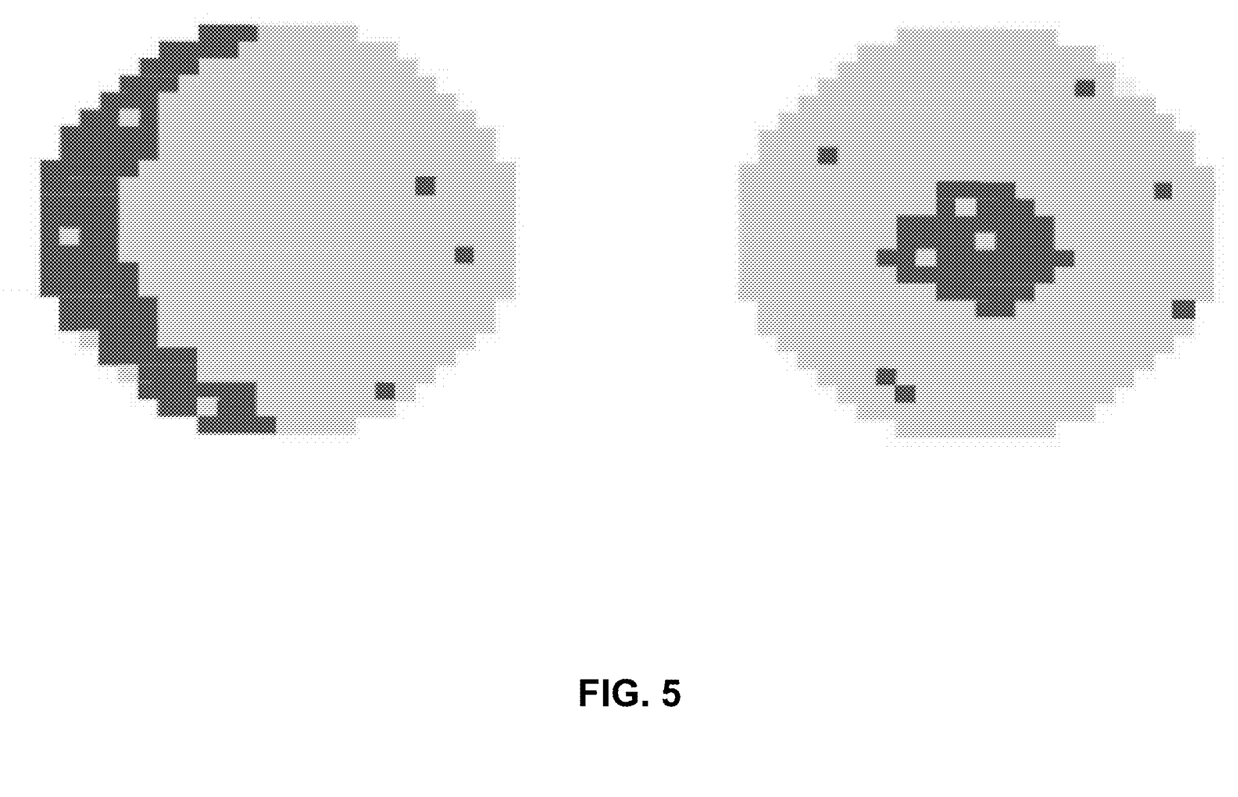
FIG. 5 illustrates examples of two systematic defect patterns, a crescent moon pattern and a Bull's-eye pattern.
Figure 6A:
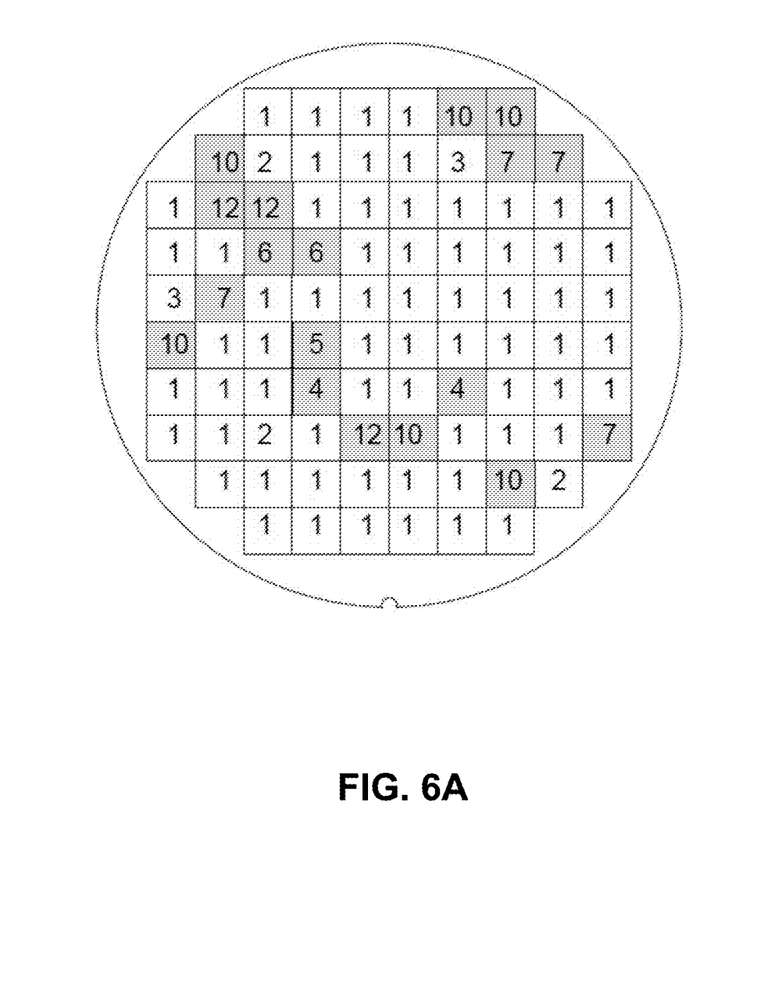
FIG. 6A illustrates an example of a wafer map having non-binary bin codes for the dies.
Figure 6B:
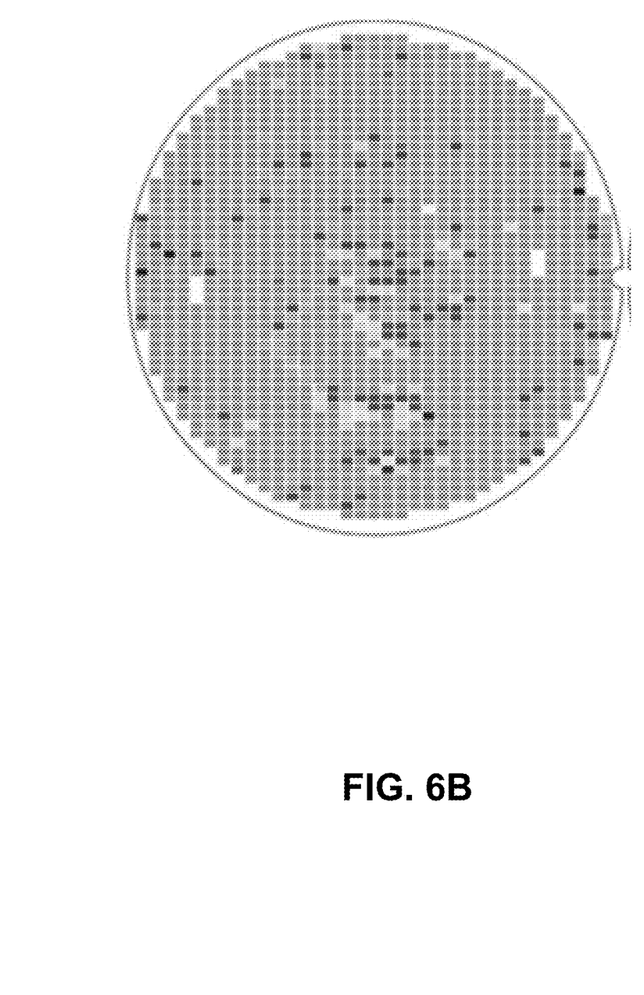
FIG. 6B illustrates an example of a wafer map which uses different colors to represent bin codes.
Figure 7:
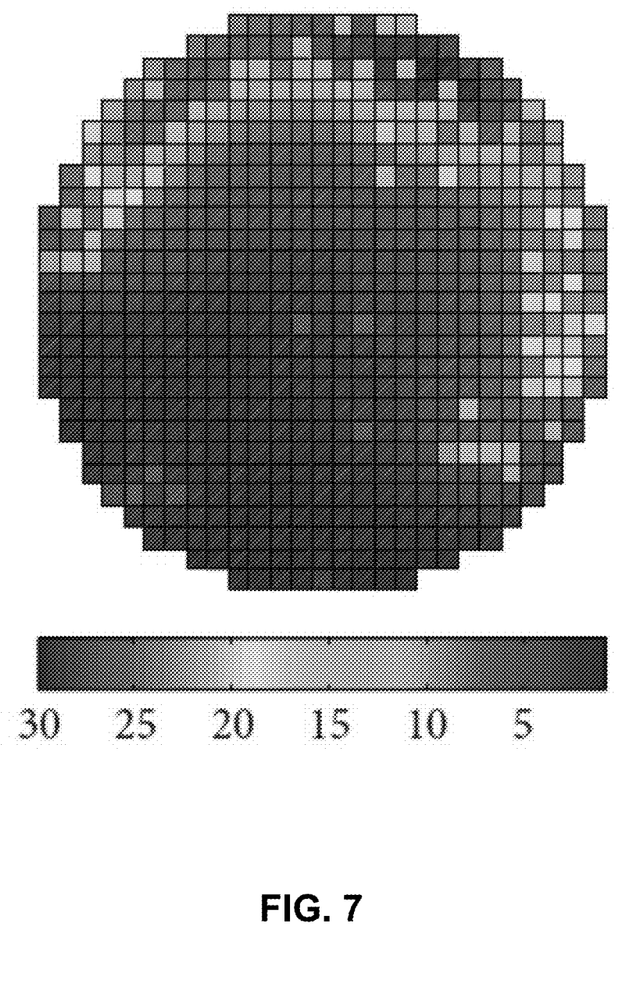
FIG. 7 illustrates an example of a wafer map using a continuous value representation.

FIG. 4 illustrates an example of 20 mm×20 mm dies on a 300 mm wafer. FIG. 5 illustrates examples of two systematic defect patterns, a crescent moon pattern and a Bull's-eye pattern. The wafer maps shown in FIG. 5 use binary representation of good and bad dies. A wafer map can also be represented by bin codes. FIG. 6A illustrates such an example. In FIG. 6B, different bin codes are represented by different colors. While the integer representation is useful, the binary/integer value may be transformed into a continuous value for some purposes. FIG. 7 illustrates an example of a wafer map using a continuous value representation. FIGS. 5, 6A, 6B and 7 provide several examples of wafer maps that may be analyzed using the disclosed technology but do not form an exhaustive list.

The one or more defect patterns used in the operation 310 may be extracted from wafer maps through various approaches. A statistical approach typically classifies patterns based on an extracted feature set, and an underlying statistical model for generating these patterns. For example, an averaging operation can first be performed on good or bad die images (white and black; 0 and 1), in which each die was averaged by its 3×3 or 5×5 neighboring dies. The obtained average value replaces the original binary value. As such, the binary wafer map is transformed into a smoothed greylevel wafer map. A threshold value is then selected. If the grey level of a die exceeds the threshold value, it is determined to be bad; otherwise, it is good. A similar approach, referred to as nearest neighborhood residual (NNR), can be applied to parametric testing results such as Iddq data to reduce background current and fault-free Iddq variance.

An unsupervised machine learning based approach such as the adaptive resonance theory (ART) can also be used to extract defect patterns. The adaptive resonance theory is a neural network-based approach. The ART network accepts input vectors that are classified according to the stored pattern they most resemble. The ART network also provides a mechanism allowing adaptive expansion of the neuron output layers until an adequate size is reached based on the number of classes. The ART network can adaptively create a new neuron corresponding to an input pattern if that pattern is determined to be 'sufficiently' different from the existing clusters. Genetic algorithms are another type of unsupervised machine learning techniques. Genetic algorithms rely on bio-inspired operators such as mutation, crossover and selection, and can be employed to perform pattern classification as well.

Additionally or alternatively, the one or more defect patterns used in the operation 310 may be extracted from wafer maps by an engineer based on his or her experience and domain knowledge or provided by a fabrication facility. The association between each of the one or more defect patterns and a specific manufacture problem may be determined based on other measurements, analyses and/or human experiences.

The pattern variant generation unit 210 can obtain the defect pattern variants of an extracted defect pattern by changing the location of the defect pattern, rotating the defect pattern, changing the scale of the defect pattern, or any combination thereof. Other operations such as creating an opening, dilation and changing density may also be performed by the pattern variant generation unit 210.

Refer back to the flowchart 300. In operation 320, the pattern superimposition unit 220 superimposes each of the defect pattern variants on wafer maps of wafers having no systematic defects to generate positive training data of wafer maps for a training dataset. A training dataset is a dataset of examples used for learning or to fit the parameters (e.g., weights) of, for example, a machine learning model. In this disclosure, a training dataset may also comprise data for validating the machine learning model. The generated positive training data of wafer maps may be employed not only for training, but also for validating a machine learning model.

Figure 8:
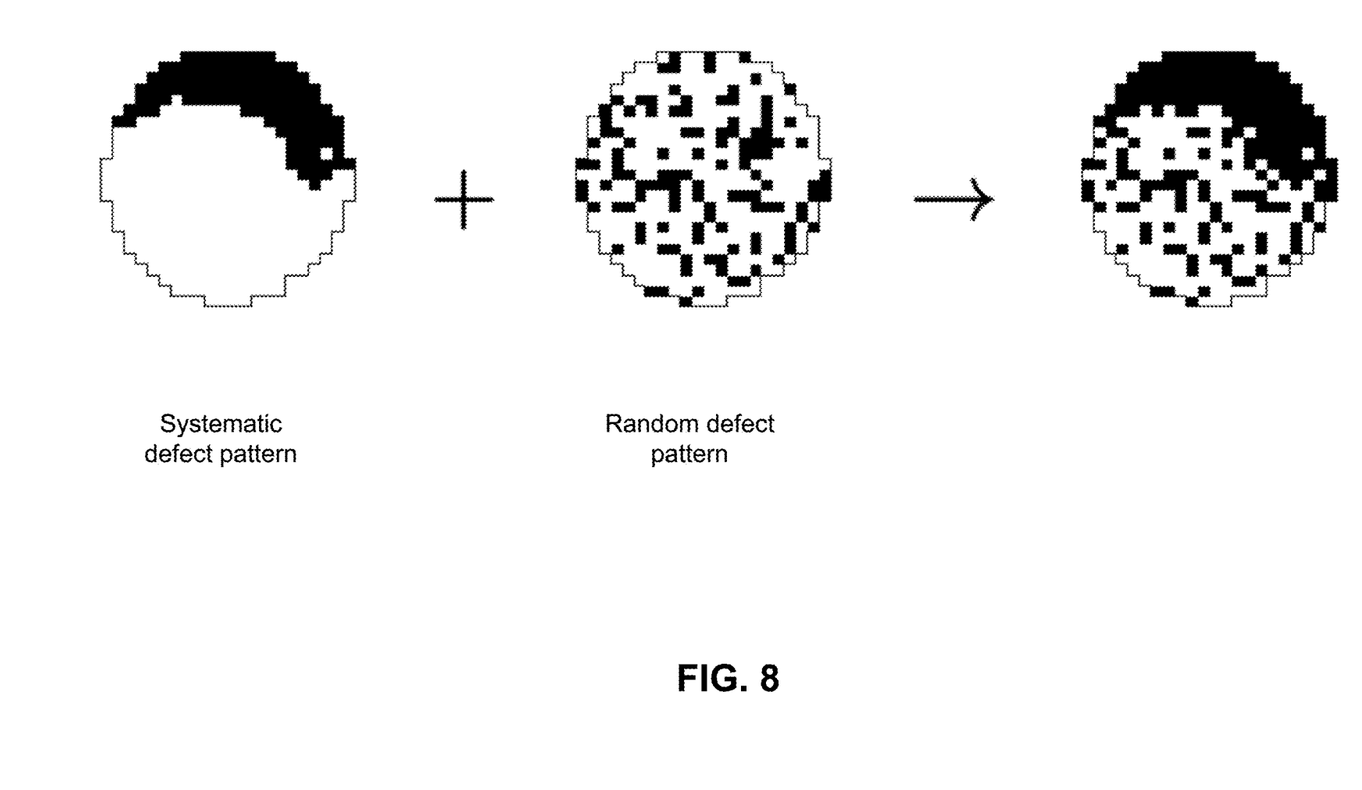
FIG. 8 illustrates an example of a wafer map on which a defect pattern can be separated into a systematic defect pattern and a random defect pattern.

Training data quality is one of the critical factors for deriving a good trained machine model. A high-quality training dataset should have lots of unbiased data over the entire range of inputs for which one aims to develop the predictive model. The disclosed technology employs two approaches to enhance the quality of the training dataset. Generating the defect pattern variant in the operation 310 can extend the range of training samples and thus help a machine learning model to recognize a broader scope of similar patterns. Superimposing these generated defect pattern variants on wafer maps of "good" wafers in the operation 320 can help a machine learning model to identify systematic defect patterns from noisy background. One source of the noisy background is random defects as noted previously. FIG. 8 illustrates an example of a wafer map on which a defect pattern can be separated into a systematic defect pattern and a random defect pattern. While the availability of wafer maps having systematic defect patterns is limited, there are a large number of wafer maps having no systematic defect patterns available. The disclosed technology takes the advantage of it to create high-quality and large-quantity training samples. This is especially useful for deep-learning-based machine learning techniques.

Figure 9A:
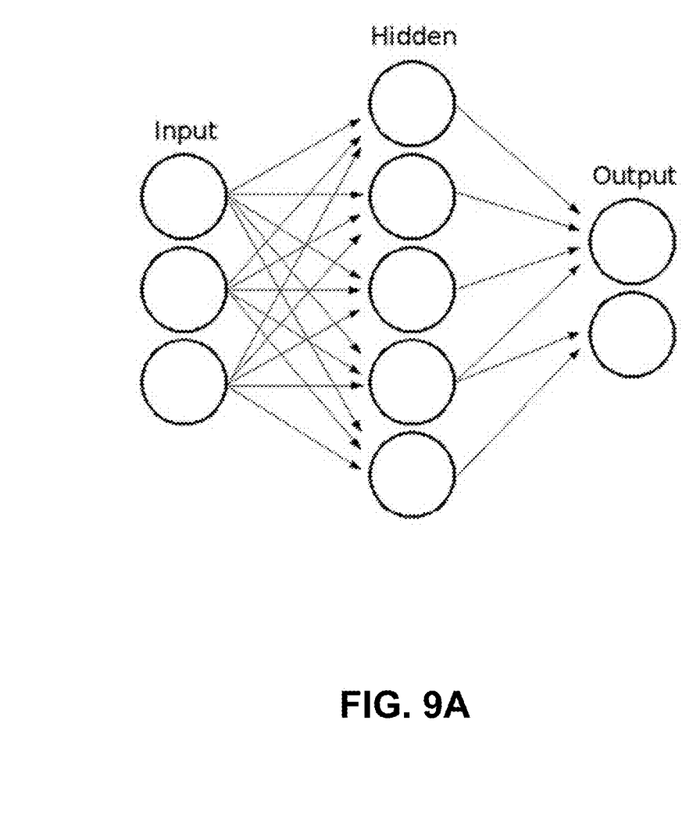
FIG. 9A illustrates an example of an artificial neural network.
Figure 9B:
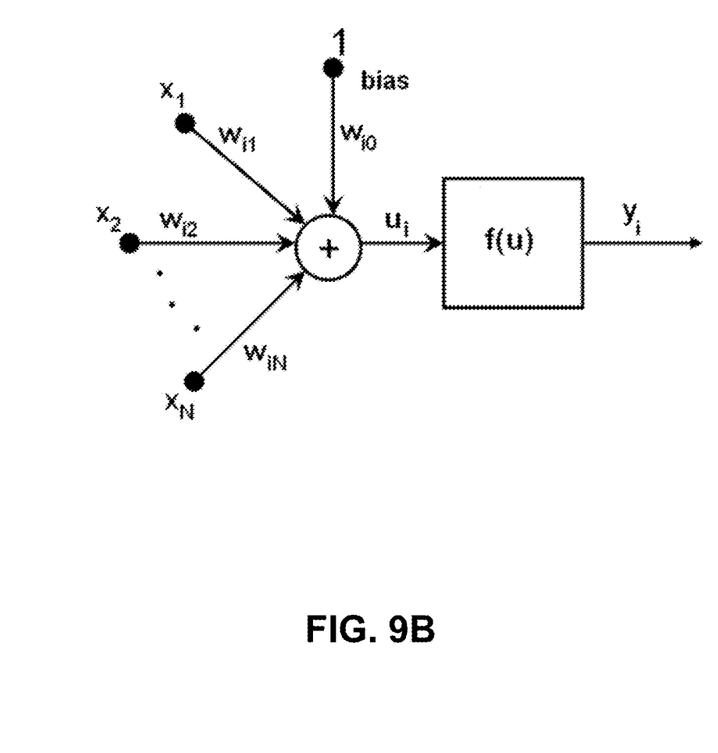
FIG. 9B illustrates an example of a part of an artificial neural network.

In operation 330 of the flowchart 300, the machine learning model training unit 230 derives a trained machine-learning model for recognizing known defect patterns on wafer maps based on the training dataset. The known defect patterns comprise the one or more defect patterns. The machine-learning model may be constructed based on an artificial neural network, a support vector machine or other supervised machine learning models. If the machine-learning model is a neural network based model as illustrated in FIG. 9A, multiple hidden layers may be used to separate the input/output layer. Each neuron may be assigned an input bias and output weight, and may use a symmetrical sigmoid activation function as illustrated in FIG. 9B. The weights and bias values are then varied and evolved during training, based on the successful detection of the provided positive and negative wafer maps in the training dataset.

The machine-learning model to be trained may be an untrained machine learning model or a previously trained machine learning model. For a previously trained model, the new training data may be used directly for further training if the one or more defect patterns belong to some or all of the defect patterns upon which the model was trained to recognize. The newly generated positive training data of wafer maps may also be combined with the old training data to train a machine learning model modified from the previously trained model if a new systematic defect pattern is found.

Figure 10:
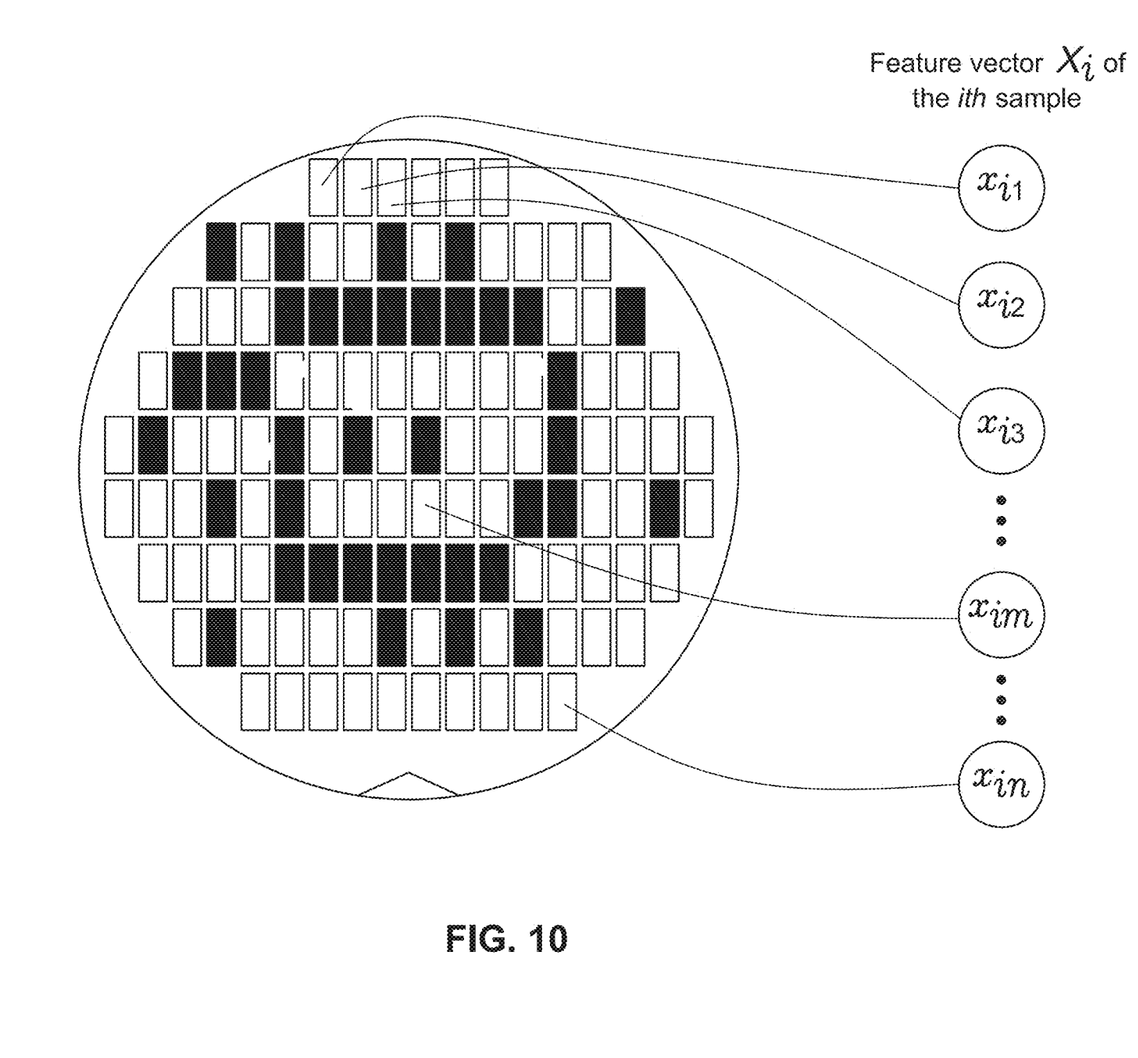
FIG. 10 illustrates an example of constructing a feature vector based on a wafer map that may be implemented according to various embodiments of the disclosed technology.

In operation 340 of the flowchart 300, the machine learning model application unit 240 analyzes wafer maps for newly-fabricated wafers based on the trained machine-learning model. To train and to apply the machine-learning model, a wafer map may be transformed into a feature vector (or characteristic vector) containing a number of features that are descriptive of the wafer map. FIG. 10 illustrates an example of a feature vector. In this example, the number of dies ("n") on a wafer determines the dimension of the feature vector $X_i$ (in the cases of neural network model, the number of nodes on the input layer). A black-colored die indicates a defective die and a white-colored die indicates a non-defective die based on the measurements. After the trained machine learning model processes a feature vector for a wafer map, the output may indicate whether one of the known defect patterns exists on the wafer map, how similar it is to the one of the known defect patterns and where it is on the wafer map.

Each of the known defect patterns may be associated with a specific manufacturing problem. In operation 350, the yield enhancing unit 250 may adjust manufacturing processes, manufacturing equipment or both based on root causes identified from the analysis results obtained in the operation 360. In operation 360, the die processing unit 260 may identify dies that pass measurements comprising the one or more measurements but are at higher risk of field failure based on failure patterns identified from the analysis. These dies will not be processed by the following packaging steps.

Integrated circuits are used in mobile devices like smartphones and tablets. Increasingly these devices are becoming mission critical to people's daily lives. Over one and half billion smartphones were shipped in 2017, and a failure rate of just 0.00001% would represent more than 1.5 million unhappy customers. For the IC manufacturers who are designing these products, an excessive failure rate could mean the loss of the next generation socket and a huge financial impact. The disclosed technology can enable fast and accurate identification of outliers which are otherwise good circuits but exhibit characteristics that are atypical when compared to parts from the same wafer or lot.

CONCLUSION

While the disclosed technology has been described with respect to specific examples including presently preferred modes of carrying out the disclosed technology, those skilled in the art will appreciate that there are numerous variations and permutations of the above described systems and technology that fall within the spirit and scope of the disclosed technology as set forth in the appended claims. For example, while the circuit probe testing has been employed to describe the disclosed technology, it should be appreciated that various examples of the disclosed technology may be implemented for analyzing data obtained from other tests.

What is claimed is:

1. One or more non-transitory computer-readable media storing computer-executable instructions, the computer-executable instructions, when executed, causing one or more processors to perform a method, the method comprising:
   generating defect pattern variants of one or more defect patterns, the one or more defect patterns being extracted from wafer maps of wafers having at least systematic defects, a wafer map of a wafer being a map generated based on results of one or more measurements performed on the wafer;
   superimposing each of the defect pattern variants on wafer maps of wafers having no systematic defects to generate positive training data of wafer maps to be included in a training dataset; and deriving a trained machine-learning model for recognizing known defect patterns on wafer maps based on the training dataset, the known defect patterns comprising the one or more defect patterns.

2. The one or more non-transitory computer-readable media recited in claim 1, wherein the method further comprises:

analyzing wafer maps for newly-fabricated wafers based on the trained machine-learning model.

3. The one or more non-transitory computer-readable media recited in claim 2, wherein the method further comprises:

adjusting manufacturing processes, manufacturing equipment or both based on root causes identified from the analyzing.

4. The one or more non-transitory computer-readable media recited in claim 2, wherein the method further comprises:

identifying dies that pass measurements but are at higher risk of field failure based on failure patterns identified from the analyzing, the measurements comprising the one or more measurements.

5. The one or more non-transitory computer-readable media recited in claim 1, wherein the machine learning model is constructed based on an artificial neural network.

6. The one or more non-transitory computer-readable media recited in claim 1, wherein the one or more defect patterns are extracted using an unsupervised machine learning model or a statistical technique.

7. The one or more non-transitory computer-readable media recited in claim 1, wherein the defect pattern variants comprise rotational variants, location variants, size variant, or any combination thereof.

8. The one or more non-transitory computer-readable media recited in claim 1, wherein the one or more measurements comprise circuit probe testing.

9. A method, executed by at least one processor of a computer, comprising:

generating defect pattern variants of one or more defect patterns, the one or more defect patterns being extracted from wafer maps of wafers having at least systematic defects, a wafer map of a wafer being a map generated based on results of one or more measurements performed on the wafer;

superimposing each of the defect pattern variants on wafer maps of wafers having no systematic defects to generate positive training data of wafer maps to be included in a training dataset; and deriving a trained machine-learning model for recognizing known defect patterns on wafer maps based on the training dataset, the known defect patterns comprising the one or more defect patterns.

10. The method recited in claim 9, wherein the method further comprises:

analyzing wafer maps for newly-fabricated wafers based on the trained machine-learning model.

11. The method recited in claim 10, wherein the method further comprises:

adjusting manufacturing processes, manufacturing equipment or both based on root causes identified from the analyzing.

12. The method recited in claim 10, wherein the method further comprises:

identifying dies that pass measurements but are at higher risk of field failure based on failure patterns identified from the analyzing, the measurements comprising the one or more measurements.

13. The method recited in claim 9, wherein the machine learning model is constructed based on an artificial neural network.

14. The method recited in claim 9, wherein the one or more defect patterns are extracted using an unsupervised machine learning model or a statistical technique.

15. The method recited in claim 9, wherein the defect pattern variants comprise rotational variants, location variants, size variant, or any combination thereof.

16. The method recited in claim 9, wherein the one or more measurements comprise circuit probe testing.

17. A system comprising:

one or more processors, the one or more processors programmed to perform a method, the method comprising:

generating defect pattern variants of one or more defect patterns, the one or more defect patterns being extracted from wafer maps of wafers having at least systematic defects, a wafer map of a wafer being a map generated based on results of one or more measurements performed on the wafer;

superimposing each of the defect pattern variants on wafer maps of wafers having no systematic defects to generate positive training data of wafer maps to be included in a training dataset; and deriving a trained machine-learning model for recognizing known defect patterns on wafer maps based on the training dataset, the known defect patterns comprising the one or more defect patterns.

18. The system recited in claim 17, wherein the method further comprises:

analyzing wafer maps for newly-fabricated wafers based on the trained machine-learning model.

19. The system recited in claim 18, wherein the method further comprises:

adjusting manufacturing processes, manufacturing equipment or both based on root causes identified from the analyzing.

20. The system recited in claim 18, wherein the method further comprises:

identifying dies that pass measurements but are at higher risk of field failure based on failure patterns identified from the analyzing, the measurements comprising the one or more measurements.

21. The system recited in claim 17, wherein the machine learning model is constructed based on an artificial neural network.

22. The system recited in claim 17, wherein the one or more defect patterns are extracted using an unsupervised machine learning model or a statistical technique.

23. The system recited in claim 17, wherein the defect pattern variants comprise rotational variants, location variants, size variant, or any combination thereof.

24. The system recited in claim 17, wherein the one or more measurements comprise circuit probe testing.

* * * * *